United States Patent [19]
Nilsson

[11] Patent Number: 4,840,079
[45] Date of Patent: Jun. 20, 1989

[54] PUSH-PULL CONTROL, E.G., A HAND THROTTLE OR STOP CONTROL FOR INTERNAL COMBUSTION ENGINES

[75] Inventor: Ingmar Nilsson, Askim, Sweden

[73] Assignee: TX Controls AB, Vastra Frolunda, Sweden

[21] Appl. No.: 121,142

[22] Filed: Nov. 16, 1987

[30] Foreign Application Priority Data

Nov. 18, 1986 [SE] Sweden ............................. 8604929

[51] Int. Cl.⁴ ............................................. F16C 1/10
[52] U.S. Cl. ........................... 74/500.5; 74/501.5 R; 132/111 A; 132/30 W; 188/196 B; 188/196 R
[58] Field of Search ....... 74/501 R, 501.5 R, 501.5 H, 74/502, 503; 192/111 A, 30 W, 70.25; 188/196 B, 196 R, 265, 2 D; 340/52 R, 52 B

[56] References Cited

U.S. PATENT DOCUMENTS

| | | | |
|---|---|---|---|
| 2,921,481 | 1/1960 | Phelan | 74/501.5 |
| 2,957,354 | 10/1960 | Morrow | 74/501.5 |
| 2,975,649 | 3/1961 | Propst | 74/501.5 R |
| 3,521,502 | 7/1970 | Houk | 74/502 |
| 4,050,327 | 9/1977 | Thomas et al. | 74/502 |
| 4,274,300 | 6/1981 | Golobay | 74/501.5 R |
| 4,348,348 | 9/1982 | Bennett et al. | 74/502 |
| 4,378,713 | 4/1983 | Haskell et al. | 74/501.5 R |
| 4,537,090 | 8/1985 | Jones | 74/502 |
| 4,542,661 | 9/1985 | Teramachi | 74/501.5 R |

FOREIGN PATENT DOCUMENTS

| | | | |
|---|---|---|---|
| 454135 | 1/1949 | Canada | 74/502 |
| 466657 | 7/1950 | Canada | 74/502 |
| 1022850 | 1/1958 | Fed. Rep. of Germany | 74/502 |

*Primary Examiner*—Vinh Luong
*Attorney, Agent, or Firm*—Young & Thompson

[57] ABSTRACT

A push-pull control with a housing and a push-pull rod displaceable in the housing. The rod is joined via a jointing piece to a control cable. The push-pull rod is provided at its end with a neck portion and a ball, which engages in a bore and a slot in the jointing piece. A sleeve which is limitedly displaceable on the push-pull rod engages the jointing piece and fixes it radially relative to the rod.

4 Claims, 1 Drawing Sheet

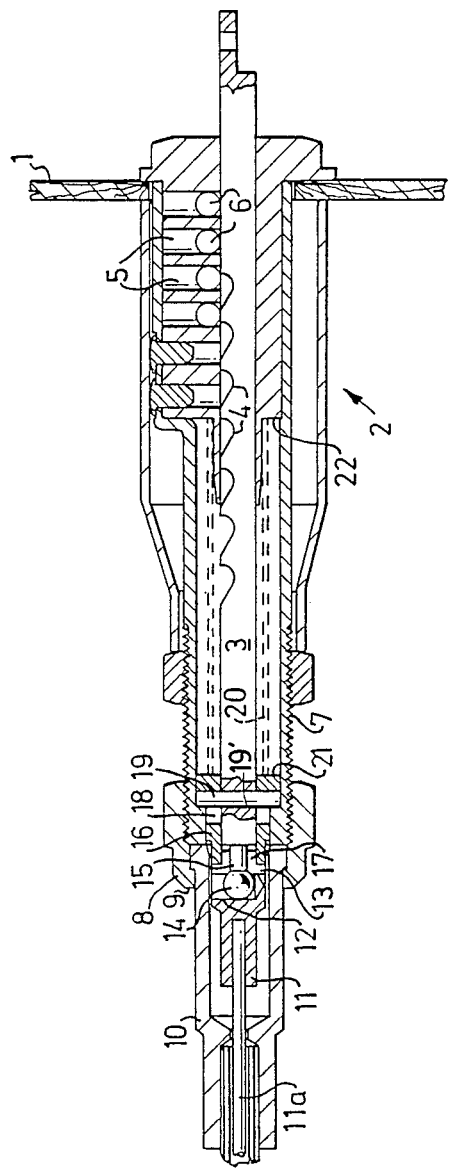

PUSH-PULL CONTROL, E.G., A HAND THROTTLE OR STOP CONTROL FOR INTERNAL COMBUSTION ENGINES

FIELD OF THE INVENTION

The present invention relates to a control device, e.g. a hand throttle or stop control for internal combustion engines, comprising a housing, a push-pull rod displaceably mounted in the housing and a connector element for connecting an operating element to the push-pull rod, the connector element and the push-pull rod having profiled interfitting end portions which can be coupled together by an engagement movement transverse to the longitudinal axis of said parts.

BACKGROUND OF THE INVENTION

Push-pull controls, mounted for example on the vehicle instrument panel and which control via a cable some function of the engine for example, are usually designed so that the operating cable can be easily attached or released from the control. In a known control of the type described by way of introduction, for this purpose a connector element joined to a control cable is made with a radial bore from which a radial groove extends to the end of the element facing the push-pull rod. The groove is narrower than the bore. The push-pull rod has at its end a portion with smaller diameter than the rest of the push-pull rod which portion terminates in a ball. By adapting the ball to the radial bore and the end portion to the groove, the parts can be coupled together by slipping the ball and the neck portion laterally down into the bore and groove. After connection to the control housing, the surrounding cable casing prevents unintentional decoupling of the parts.

Usually the cable casing is fixed to the housing with the aid of a threaded nut or sleeve, which is screwed over a threaded portion of the housing. If this connection should become unscrewed, for example due to vibration and insufficient tightening of the nut, there is nothing to secure the connection between the control cable connecting element and the push-pull rod and the result will be that the components will either be disconnected from each other or become misaligned with the resulting risk that they will jam in the control housing.

The purpose of the present invention is to secure by simple means a control device of the type described by way of introduction against disconnection or misalignment of the above-mentioned parts should the connection between the cable casing and the control housing become disconnected.

This is achieved according to the invention by virtue of the fact that the push-pull rod surrounded by a sleeve element, which is limited displaceably relative to the push-pull rod and is springloaded towards an end position, in which it engages the connector and prevents it from moving relative to the push-pull rod in a direction transverse to the longitudinal axis.

In addition to the above described secury against disconnection, the sleeve element aids in centering the connector element, which contributes to reducing friction between the control housing and the moving parts.

BRIEF DESCRIPTION OF THE DRAWING

The invention will be described in more detail with reference to an example shown in the accompanying drawing, which shows a longitudinal section through one embodiment of the push-pull control.

DETAILED DESCRIPTION OF THE INVENTION

In the figure, 1 designates a panel to which there is fixed a control housing, generally designated 2. The general operation construction of the control is known per se and will only be dealt with briefly here. In the housing 2, a cylindrical push-pull rod 3 is slideably disposed. The rod 3 is made with a number of notches 4, into which balls 6, disposed in bores 5 in the housing can move to block the push-pull rod in the housing. The spacings between the balls 6 and the cavities is different to provide the greatest possible number of blocking positions when the rod is pulled out. Release of the rod is achieved by turning it whereupon the ball 6 which happens to be locked in the rod is forced out of the notch 4.

The distal end of the housing 2 has a threaded portion 7 to which a nut 8 is screwed and via a flange 9 holds the end surface of a jointing sleeve 10 on a cable casing (not shown) against an end surface of the housing 2. The sleeve 10 encloses a connector element or jointing piece 11 which is securely pressed onto the end of a control cable 11a.

The jointing piece 11 has a radial cavity or bore 12 and a slot 13 extending from the end of the jointing piece to the bore 12. The push-pull rod 3 is provided at its distal end with a ball 14, the diameter of which is adapted to the bore 12 and a neck portion 15, the diameter of which is adapted to the width of the slot 13. By slipping the ball 14 and the neck portion 15 into the bore 12 and slot 13 respectively the relative each other.

In order to achieve radial fixation of the parts 3, 11 and thus completely interlock the parts, a sleeve 16 is provided according to the invention concentric to the rod 3. The sleeve 16 has an outer portion which extends over a portion 17 of reduced diameter of the jointing piece 11 and has opposing elongated openings 18 into which there extends a pin 19 which is fixed in a radial bore 19' in the push-pull rod 3, thus making the sleeve 16 displaceable on the push-pull rod the distance permitted by the openings 18. The length of the openings 18 is adapted to the length of the portion 17 of the jointing piece 11 so that the sleeve 16 is displaceable to the right from the position in the figure to a position in which the portion 17 lies entirely outside the sleeve. In this position it is possible—providing the lock nut 8 has been unscrewed and the jointing sleeve 10 of the cable casing is pushed back to expose the bore 12 and the ball 14—to move the jointing piece 11 downwards from the position shown in the figure to release it from the push-pull rod 3.

The sleeve 16 is biased into engagement with the jointing piece 11 by a helical spring 20, which surrounds the push-pull rod 3 and is compressed between a flange 21 on the sleeve 16 and a stationary wall 22 in the housing. The spring 20 also serves as the regular return spring for the push-pull rod 3 and thus has a double function.

As can be seen from the figure, the jointing piece 11 is of somewhat smaller diameter than the sleeve 16, which means that when the jointing piece is centered by the sleeve 16, only the sleeve will be in contact with the housing. The sleeve can be made in a suitable plastics material which provides low friction thus ensuring that the push-pull rod will be easy to operate.

I claim:

1. Control device comprising a housing, a push-pull rod displaceably mounted in the housing and having a longitudinal axis, and a connector element for connecting an operating element to the push-pull rod, the connector element and the push-pull rod having profiled interfitting end portions which can be coupled together by an engagement movement perpendicular to said longitudinal axis, characterized in that the push-pull rod is surrounded by a sleeve element, which is limitedly displaceable relative to the push-pull rod and is spring-loaded towards an end position, in which the sleeve element engages the connector element and prevents the connector element from moving relative to the push-pull rod in a direction perpendicular to said longitudinal axis.

2. Control device according to claim 1, characterized in that the push-pull rod has a neck portion with reduced cross-section in the vicinity of its distal end, that the connector element has a radial cavity which extends up to an end of the connector element and has a portion with a shape adapted to receive the distal end of the push-pull rod and a portion with a shape adapted to receive the neck portion, and that the connector element at said end has a portion with an outer diameter corresponding to the inner diameter of the sleeve element.

3. Control device according to claim 1, characterized in that the push-pull rod has a radial pin which extends into at least one radial elongated opening in the sleeve element.

4. Control device according to claim 1, characterized in that the push-pull rod is surrounded by a helical spring which is compressed between a fixed housing portion and the sleeve element and urges the pushpull rod towards an inner end position.

* * * * *